(12) United States Patent
Johnson (10) Patent No.: US 7,056,576 B2
(45) Date of Patent: Jun. 6, 2006

(54) 3D FIBER ELEMENTS WITH HIGH MOMENT OF INERTIA CHARACTERISTICS IN COMPOSITE SANDWICH LAMINATES

(75) Inventor: David W. Johnson, San Diego, CA (US)

(73) Assignee: Ebert Composites, Inc., Chula Vista, CA (US)

( * ) Notice: Subject to any disclaimer, the term of this patent is extended or adjusted under 35 U.S.C. 154(b) by 0 days.

(21) Appl. No.: 10/863,080

(22) Filed: Jun. 8, 2004

(65) Prior Publication Data

US 2004/0234742 A1 Nov. 25, 2004

Related U.S. Application Data

(63) Continuation-in-part of application No. 10/744,630, filed on Dec. 23, 2003, which is a continuation of application No. 10/059,956, filed on Nov. 19, 2001, now Pat. No. 6,676,785.

(60) Provisional application No. 60/477,445, filed on Jun. 9, 2003, provisional application No. 60/298,523, filed on Jun. 15, 2001, provisional application No. 60/293,939, filed on May 29, 2001, provisional application No. 60/281,838, filed on Apr. 6, 2001.

(51) Int. Cl.
*B32B 5/14* (2006.01)

(52) U.S. Cl. ............... 428/309.9; 428/112; 428/71; 428/317.9; 428/86; 428/119

(58) Field of Classification Search ........... 156/148, 156/91, 92, 93, 94, 322, 307.7; 428/114, 428/105, 119, 123, 172, 86, 112, 317.9, 223, 428/309.9, 71
See application file for complete search history.

(56) References Cited

U.S. PATENT DOCUMENTS

| | | | |
|---|---|---|---|
| 2,762,739 A | 9/1956 | Weiss |
| 2,954,001 A | 9/1960 | Luxenburg |
| 3,211,115 A | 10/1965 | Burillon et al. |
| 3,241,508 A | 3/1966 | Chezaud et al. |
| 3,328,218 A | 6/1967 | Noyes |
| 3,647,606 A | 3/1972 | Notaro |
| 3,761,345 A | 9/1973 | Smith |
| 3,833,695 A | 9/1974 | Vidal |
| 3,837,985 A | 9/1974 | Chase |
| 3,870,580 A | 3/1975 | Belcher |
| 3,948,194 A | 4/1976 | Gunold |
| 3,993,523 A | 11/1976 | Hunt et al. |
| 4,032,383 A | 6/1977 | Goldsworthy et al. |

(Continued)

FOREIGN PATENT DOCUMENTS

DE 4342575 A1 4/1995

(Continued)

OTHER PUBLICATIONS

Stanley et al., Development and Evaluation of Stitched Sandwich Panels, NASA-CR 2001-211025, Jun. 2001.

(Continued)

*Primary Examiner*—Merrick Dixon
(74) *Attorney, Agent, or Firm*—Stephen C. Beuerle; Procopio Cory Hargreaves & Savitch LLP (57) ABSTRACT

A shear-resistant Z-axis fiber-reinforced composite laminate structure includes a core material; an upper laminate; a lower laminate; and a plurality of contiguous cured resin Z-axis fiber bundles disposed in the core material between the upper laminate and the lower laminate to form high moment-of-inertia solid composite structural elements in the core material.

11 Claims, 7 Drawing Sheets

U.S. PATENT DOCUMENTS

| | | |
|---|---|---|
| 4,059,468 A | 11/1977 | Bouillon |
| 4,077,340 A | 3/1978 | Braum et al. |
| 4,080,915 A | 3/1978 | Bompard et al. |
| 4,196,251 A | 4/1980 | Windecker |
| 4,206,895 A | 6/1980 | Olez |
| 4,218,276 A | 8/1980 | King |
| 4,256,790 A | 3/1981 | Lackman et al. |
| 4,291,081 A | 9/1981 | Olez |
| 4,299,871 A | 11/1981 | Forsch |
| 4,331,091 A | 5/1982 | Parker et al. |
| 4,335,176 A | 6/1982 | Baumann |
| 4,402,778 A | 9/1983 | Goldsworthy |
| 4,420,359 A | 12/1983 | Goldsworthy |
| 4,495,231 A | 1/1985 | Laskaris et al. |
| 4,495,235 A | 1/1985 | Tesch |
| 4,498,941 A | 2/1985 | Goldsworthy |
| 4,506,611 A | 3/1985 | Parker et al. |
| 4,528,051 A | 7/1985 | Heinze et al. |
| 4,541,349 A | 9/1985 | Inoue |
| 4,571,355 A | 2/1986 | Elrod |
| 4,628,846 A | 12/1986 | Vives |
| 4,752,513 A | 6/1988 | Rau et al. |
| 4,761,871 A | 8/1988 | O'Conner et al. |
| 4,808,461 A | 2/1989 | Boyce et al. |
| 4,854,250 A | 8/1989 | Stuvecke et al. |
| 4,913,937 A | 4/1990 | Engdahl et al. |
| 4,917,756 A | 4/1990 | Cahuzac et al. |
| 4,955,123 A | 9/1990 | Lawton et al. |
| 4,963,408 A | 10/1990 | Huegli |
| 4,983,453 A | 1/1991 | Beall |
| 5,055,242 A | 10/1991 | Vane |
| 5,095,833 A | 3/1992 | Darrieux |
| 5,186,776 A | 2/1993 | Boyce et al. |
| 5,286,320 A | 2/1994 | McGrath et al. |
| 5,314,282 A | 5/1994 | Murphy et al. |
| 5,324,377 A | 6/1994 | Davies |
| 5,327,621 A | 7/1994 | Yasui et al. |
| 5,333,562 A | 8/1994 | LeMaire et al. |
| 5,361,483 A | 11/1994 | Rainville et al. |
| 5,373,796 A | 12/1994 | Besemann |
| 5,429,853 A | 7/1995 | Darrieux |
| 5,445,693 A | 8/1995 | Vane |
| 5,445,861 A | 8/1995 | Newton et al. |
| 5,466,506 A | 11/1995 | Freitas et al. |
| 5,490,602 A | 2/1996 | Wilson et al. |
| 5,549,771 A | 8/1996 | Brooker |
| 5,580,514 A | 12/1996 | Farley |
| 5,589,015 A | 12/1996 | Fusco et al. |
| 5,589,243 A | 12/1996 | Day |
| 5,624,622 A | 4/1997 | Boyce et al. |
| 5,632,844 A | 5/1997 | Pate et al. |
| 5,639,410 A | 6/1997 | Amaike et al. |
| 5,642,679 A | 7/1997 | Monget et al. |
| 5,667,859 A | 9/1997 | Boyce et al. |
| 5,681,408 A | 10/1997 | Pate et al. |
| 5,736,222 A | 4/1998 | Childress |
| 5,741,574 A | 4/1998 | Boyce et al. |
| 5,759,321 A | 6/1998 | Cahuzac |
| 5,770,155 A * | 6/1998 | Dunphy et al. .......... 422/82.05 |
| 5,778,806 A | 7/1998 | Badillo |
| 5,789,061 A | 8/1998 | Campbell et al. |
| 5,809,805 A | 9/1998 | Palmer et al. |
| 5,827,383 A | 10/1998 | Campbell et al. |
| 5,829,373 A | 11/1998 | Baxter |
| 5,832,594 A | 11/1998 | Avila |
| 5,834,082 A | 11/1998 | Day |
| 5,862,975 A | 1/1999 | Childress |
| 5,863,635 A | 1/1999 | Childress |
| 5,868,886 A | 2/1999 | Alston et al. |
| 5,869,165 A | 2/1999 | Rorabaugh et al. |
| 5,873,973 A | 2/1999 | Koon et al. |
| 5,876,540 A | 3/1999 | Pannell |
| 5,876,652 A | 3/1999 | Rorabaugh et al. |
| 5,876,832 A | 3/1999 | Pannell |
| 5,882,756 A | 3/1999 | Alston et al. |
| 5,882,765 A | 3/1999 | Pastureau et al. |
| 5,916,469 A | 6/1999 | Scoles et al. |
| 5,919,413 A | 7/1999 | Avila |
| 5,935,475 A | 8/1999 | Scoles et al. |
| 5,935,680 A | 8/1999 | Childress |
| 5,935,698 A | 8/1999 | Pannell |
| 5,941,185 A | 8/1999 | Selbach et al. |
| 5,958,550 A | 9/1999 | Childress |
| 5,968,639 A | 10/1999 | Childress |
| 5,972,524 A | 10/1999 | Childress |
| 5,980,665 A | 11/1999 | Childress |
| 6,027,798 A | 2/2000 | Childress |
| 6,051,089 A | 4/2000 | Palmer et al. |
| 6,090,465 A | 7/2000 | Steele et al. |
| 6,106,646 A | 8/2000 | Fairbanks |
| 6,117,260 A | 9/2000 | Rossi |
| 6,128,998 A | 10/2000 | Freitas et al. |
| 6,132,859 A | 10/2000 | Jolly |
| 6,139,942 A | 10/2000 | Hartness et al. |
| 6,151,439 A | 11/2000 | Wainwright |
| 6,187,411 B1 | 2/2001 | Palmer |
| 6,190,602 B1 | 2/2001 | Blaney et al. |
| 6,196,145 B1 | 3/2001 | Burgess |
| 6,291,049 B1 | 9/2001 | Kunkel et al. |
| 6,454,889 B1 * | 9/2002 | Hendrix et al. ................ 156/71 |
| 6,632,309 B1 * | 10/2003 | Hendrix et al. ............. 156/148 |
| 6,645,333 B1 * | 11/2003 | Johnson et al. ................ 156/92 |
| 2001/0031350 A1 | 10/2001 | Day et al. |
| 2002/0014302 A1 | 2/2002 | Fanucci et al. |
| 2002/0069503 A1 | 6/2002 | Sentmanat |
| 2002/0144767 A1 | 10/2002 | Johnson et al. |

FOREIGN PATENT DOCUMENTS

| | | |
|---|---|---|
| GB | 1275705 | 6/1970 |
| GB | 2245862 | 1/1992 |
| JP | 5-200884 A | 10/1993 |
| JP | 63-60738 A | 3/1998 |
| WO | WO 92/00845 A1 | 1/1992 |
| WO | WO 98/08271 | 2/1998 |
| WO | WO 03/011576 A1 | 2/2003 |

OTHER PUBLICATIONS

Martin, et al. "Pultrusion," Engineered Materials Handbook, vol. 1, Composites, ASM International, 1989, pp. 533-543.

Gabriele, M., "Pultrusion's Promise," Plastics Technology, Mar. 1995, pp. 36-40.

* cited by examiner

3D FIBER ELEMENTS WITH HIGH MOMENT OF INERTIA CHARACTERISTICS IN COMPOSITE SANDWICH LAMINATES

REFERENCE TO RELATED APPLICATION

This application is a continuation-in-part of U.S. patent application Ser. No. 10/744,630 filed Dec. 23, 2003, which is a continuation of U.S. patent application Ser. No. 10/059,956, U.S. Pat. No. 6,676,785, filed Nov. 19, 2001, which claims the benefit of provisional patent application 60/298,523 filed on Jun. 15, 2001; provisional patent application 60/281,838 filed on Apr. 6, 2001; and provisional patent application 60/293,939 filed on May 29, 2001 under 35 U.S.C. 119(e). This application also claims the benefit of prior provisional patent application 60/477,445 filed on Jun. 9, 2003 under 35 U.S.C. 119(e).

FIELD OF THE INVENTION

The present invention relates, in general, to composite laminate structures, and, in particular to composite laminate structures and Z-axis fiber elements in composite laminate structures with high shear modulus.

BACKGROUND OF THE INVENTION

Figure 9:
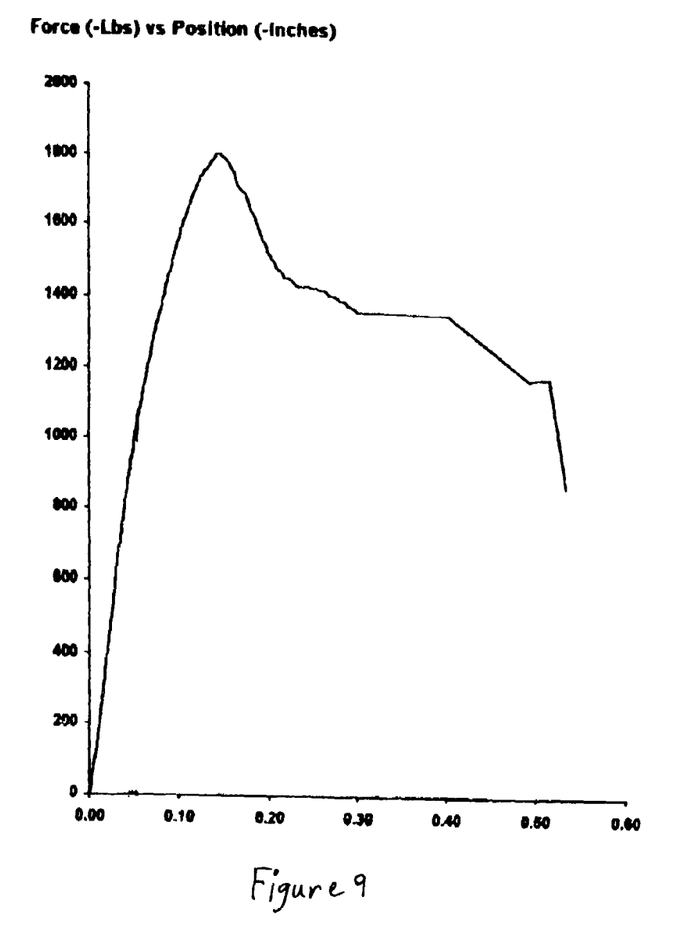
FIG. 9 is a shear graph of force versus position for a shear test run on a test piece of a Z-axis fiber-reinforced composite laminate structure.

U.S. Pat. Nos. 6,645,333 and 6,676,785, which are hereby incorporated by reference as though set forth in full, relate to methods and apparatuses for forming an improved Z-axis fiber-reinforced composite laminate structure. FIG. 9 is a graph showing the results of a shear test conducted on a 5.658 in.$^2$, 1.0-inch-thick Z-axis fiber-reinforced composite laminate structure made by a process described in the above patents. The Z-axis fiber-reinforced composite laminate structure was pultruded and included 16 Z-axis fiber bundles per square inch deposited through the skins and core in lateral rows. The laminate was wetted out, then cured in a pultrusion die, as taught by the referenced patents. The sample was tested to ASTM C273 for shear testing ("Standard Test Method for Shear Properties of Sandwich Core Materials"). The details of this sample are as follows:

Overall thickness, 1.0 inch
Core thickness, 0.7 inch
Skin thickness, top/bottom, 0.15 inch each
Core material: Polyisocyanurate foam at 2 lb./cu. ft.
Z-axis fiber bundle density of 16 per square inch
Resin: Vinyl ester resin
Length=2.921 inches
Area=5.658 in.$^2$
Width=1.937 inches From ASTM C273, the shear modulus, $G_c$, can be calculated from FIG. 9 as $$G = \frac{St}{Lb}.$$

From test data we see shear modulus=

$$\frac{\frac{1100}{0.04}(0.7)}{2.921 \times 1.937} = 3,402 \text{ psi}$$

The curve in FIG. 9 shows that at a load of 1100 lbs., the unfixed skin moves 0.040 inches. Because the area of the sample was 5.658 in.$^2$ and there was a Z-axis fiber bundle density of 16 per square inch, there were 90.5 (5.658×16=90.5) Z-axis fiber bundles in the sample. Therefore, each Z-axis fiber bundle withstood 12.15 (1100/90.5=12.15) lbs. of load as it deflected 0.040 inches.

Figure 10:
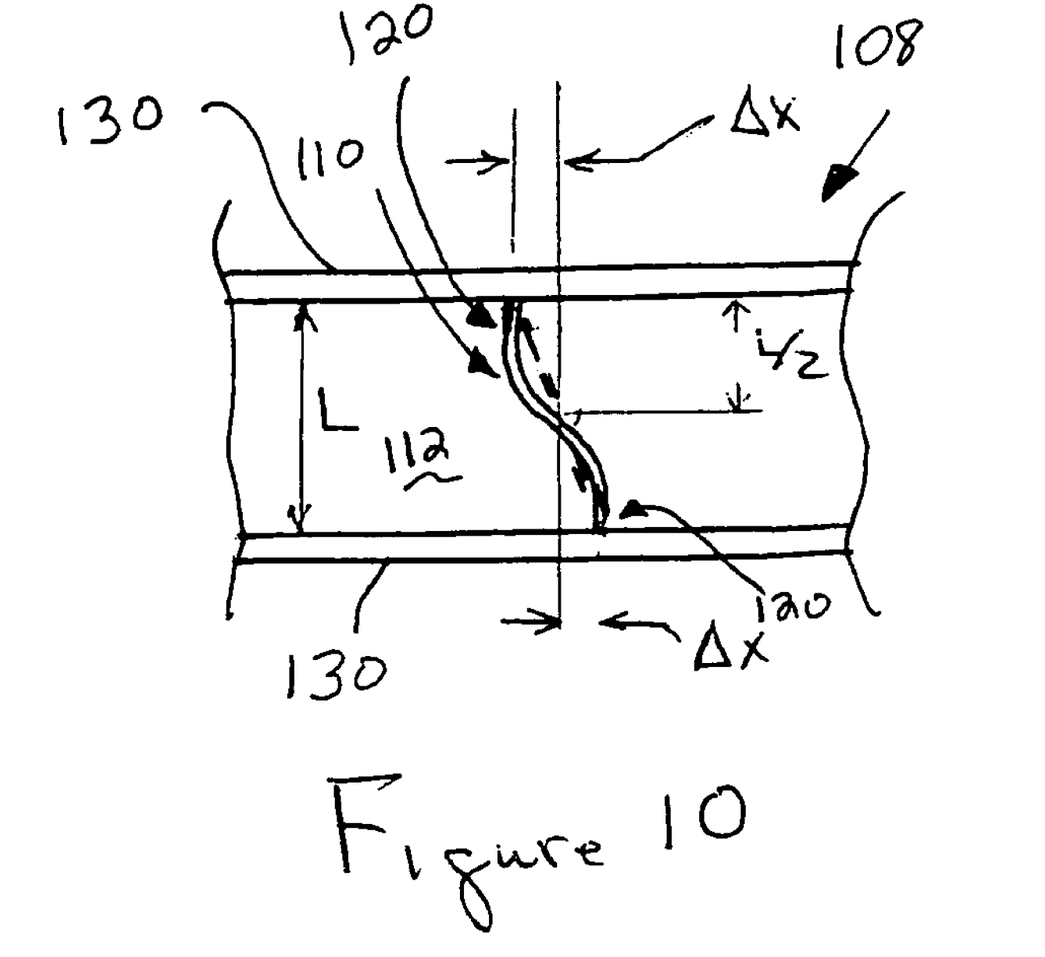
FIG. 10 is a simplified cross-sectional view of a portion of a Z-axis fiber-reinforced composite laminate structure shown in shear.

FIG. 10 is a simplified cross-sectional view of a Z-axis fiber bundle 110 in a composite laminate structure sample 108 in shear. The Z-axis fiber bundle 110 extends through a core 112 and is "fixed" near its ends 120 in skins 130. The body of the fiber bundle 110 takes a deflected configuration. The dashed line of FIG. 110 shows the slope of the deflection of the Z-axis fiber bundle 110. Using the equation for bending of a cantilevered cylinder, we get the following:

$$\Delta(deflection) = \frac{PL^3}{3EI} \quad \text{(Equation 1)}$$

The above load would apply to ½ of the length of the Z-axis fiber bundle 110 (0.35 inches) and ½ the deflection.

Using this method for estimating shear modulus, Equation 1 results in a deflection of 0.02 inches.

$$\Delta(deflection) = \frac{12.15^{lb} \cdot (.35 \text{ in.})^3}{3(3.0 \times 10^6 \text{ psi})(2.89 \times 10^{-6} \text{ in.}^4)} = 0.02 \text{ inches.}$$

Note: $P = 12.15$ lb.
$L = .35$ inches
$E =$ Modulus of Elasticity of cured Z-axis fiber bundle
$I =$ Moment of Inertia of 0.088 in diameter bundle.

Because the deflection value of 0.02 inches is only for ½ of the deflection, the total deflection for the Z-axis fiber bundle 110 is twice this amount, or 0.04 inches. Thus, actual shear test data indicating a total deflection of 0.04 inches correlates with the theoretical shear calculation indicating a total deflection of 0.04 inches.

This shear modulus value for the tested Z-axis fiber-reinforced composite laminate structure is low because the core 112 is made of a low density foam with a shear modulus below 300 psi (i.e., the foam is not resisting shear); only the Z-axis fiber bundles 110 resist shear. Although the tested Z-axis fiber-reinforced composite laminate structure is very good in toughness and overall density as a panel, there are a number of applications requiring greater shear resistance than that provided in this Z-axis fiber-reinforced composite laminate structure. For example, in bending applications, the Z-axis fiber-reinforced composite laminate structure should have both high flexural strength and high shear strength. Thus, a need exists to increase the shear strength of Z-axis fiber-reinforced composite laminate structures, especially in the core.

The need to increase shear strength in the Z-axis fiber-reinforced composite laminate structure increases for larger sandwich thickness applications requiring flexural stiffness and shear stiffness. When thicker Z-axis fiber-reinforced composite laminate structures are made with the process described in U.S. Pat. Nos. 6,645,333 and 6,676,785, the Z-axis fiber bundles 110 will necessarily be longer. Therefore, the length (L-term) of the Z-axis fiber bundles in equation 1 becomes greater, and because deflection is directly proportional to the cube of the length, the deflection becomes greater. Also, the shear modulus decreases as the sandwich thickness increases, making the shear deflections excessive and the fiber composite structure inadequate for larger sandwich thickness applications requiring flexural stiffness and shear stiffness.

SUMMARY OF INVENTION

The present invention increases shear modulus in 3-D Z-axis fiber-reinforced composite laminate structures, especially in the core, by creating high moment-of-inertia solid composite internal panels made of contiguous cured resin Z-axis fiber bundles in the Z-Y and Z-X directions.

Accordingly, an aspect of the invention involves a shear-resistant Z-axis fiber-reinforced composite laminate structure including a core material; an upper laminate; a lower laminate; and a plurality of contiguous cured resin Z-axis fiber bundles disposed in the core material between the upper laminate and the lower laminate to form high moment-of-inertia solid composite structural elements in the core material.

Another aspect of the invention involves a method of creating a shear-resistant Z-axis fiber-reinforced composite laminate structure. The method includes providing a core material; providing an upper laminate; providing a lower laminate; inserting a plurality of contiguous Z-axis fiber bundles in the core material between the upper laminate and the lower laminate; wetting the plurality of contiguous Z-axis fiber bundles with a resin; and curing the resin to form high moment-of-inertia solid composite structural elements in the core material made of the plurality of contiguous, cured resin Z-axis fiber bundles disposed in the core material between the upper laminate and the lower laminate.

Further objects and advantages will be apparent to those skilled in the art after a review of the drawings and the detailed description of the preferred embodiments set forth below.

DETAILED DESCRIPTION OF PREFERRED EMBODIMENTS

With reference generally to FIGS. 1–12, a Z-axis fiber-reinforced composite laminate structure 140 with high moment-of-inertia cured resin fiber structural elements 142 will be described. Before describing the Z-axis fiber-reinforced composite laminate structure 140 and high moment-of-inertia cured resin Z-axis fiber structural elements 142, a method and application for forming a pultruded and clinched 3-D Z-axis fiber-reinforced composite laminate structure will be described.

Figure 1:
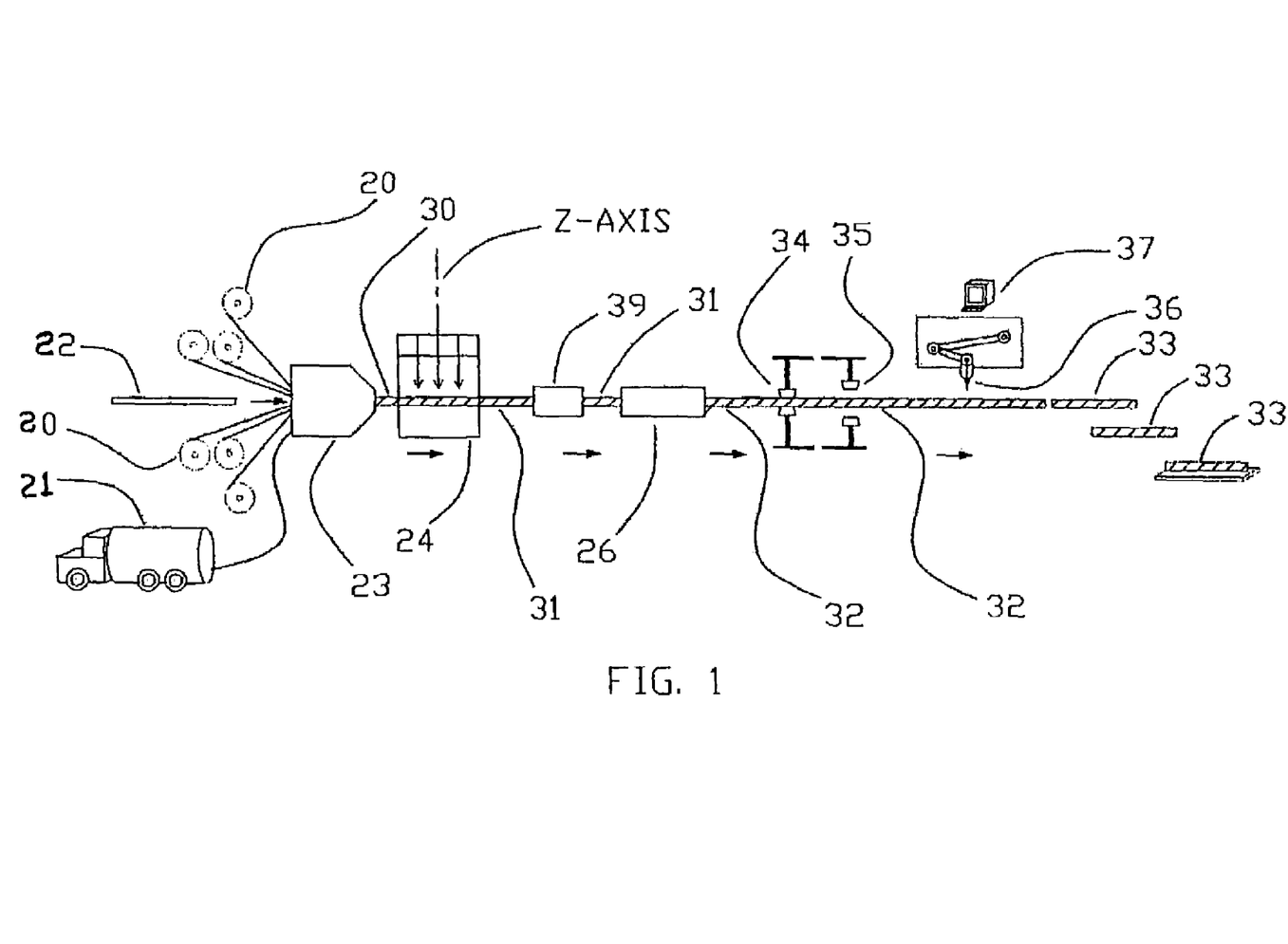
FIG. 1 is a schematic illustration of a method and apparatus for forming continuously and automatically the subject 3-D Z-axis reinforced composite laminate structure.

FIG. 1 illustrates a method and application for forming a pultruded and clinched 3-D Z-axis fiber reinforced composite laminate structure. The pultrusion direction is from left-to-right in FIG. 1 as shown by the arrows. The key components of the apparatus will become evident through the following description.

Shown in FIG. 1 are the grippers 34 and 35. These are typically hydraulically actuated devices that can grip a completely cured composite laminate panel 32 as it exits pultrusion die 26. These grippers 34, 35 operate in a hand-over-hand method. When gripper 34 is clamped to the panel 32, it moves a programmed speed in the direction of the pultrusion, pulling the cured panel 32 from the die 26. Gripper 35 waits until the gripper 34 has completed its full stroke and then takes over.

Upstream of these grippers, the raw materials are pulled into the die in the following manner. It should be recognized that all of the raw material is virgin material as it arrives from various manufacturers at the far left of FIG. 1. The fiber 20 can be glass fiber, either in roving rolls with continuous strand mat or it can be fabric such as x-y stitched fabric or woven roving. Besides glass, it can be carbon or aramid or other reinforcing fiber. A core material 22 is fed into the initial forming of the sandwich preform. The skins of the sandwich will be formed from the layers of fiber 20 on both the top and bottom of the sandwich preform 30. The core 22 will be the central section of the sandwich. The core can be made of urethane or PVC foam, or other similar foams in densities from 2 lbs. per cubic foot to higher densities approaching 12 lbs. per cubic foot. Alternatively core 22 could be made of end-grain balsa wood having the properties of 6 lb. per cubic foot density to 16 lb. per cubic foot.

The raw materials are directed, automatically, in the process to a guidance system in which resin from a commercial source 21 is directed to a primary wet-out station within resin tank 23. The wetted out preform 30 exits the resin tank and its debulking station in a debulked condition, such that the thickness of the panel section 30 is very nearly the final thickness of the ultimate composite laminate. These panels can be any thickness from 0.25 inches to 4 inches, or more. The panels can be any width from 4 inches wide to 144 inches wide, or more. Preform 30 is then directed to the Z-axis fiber deposition machine 24 that provides the deposition of 3-D Z-axis groupings of fiber filaments. The details as to how Z-axis filter deposition machine 24 functions is the subject of the referenced U.S. Pat. No. 6,645,33, which is incorporated into this patent application by reference as though set forth in full. This system is computer controlled so that a wide variety of insertions can be made. Machine 24 can operate while stationary or can move synchronously with the gripper 34 speed. Groupings of fiber filaments are installed automatically by this machine into the preform 31 that is then pulled from the Z-axis fiber deposition machine 24. Preform 31 has been changed from the preform 30 by only the deposition of 3-D Z-axis groupings of fiber filaments, all of which are virgin filaments as they have arrived from the manufacturer, such as Owens Corning.

Modified preform 31 of FIG. 1 now automatically enters a secondary wet-out station 39. Station 39 can be the primary wet-out, eliminating station 23, as an alternative method. This station helps in the completion of the full resin wet-out of the composite laminate structure, including the 3-D Z-axis groupings of fiber filaments. Preform 31 then enters pultrusion die 26 mentioned earlier and through heat preform 31 is brought up in temperature sufficiently to cause catalyzation of the composite laminate panel. Exiting die 26 is the final cured panel section 32 which is now structurally strong enough to be gripped by the grippers 34 and 35.

The sandwich structure of FIG. 1 can then be made any length practicable by handling and shipping requirements. Downstream of the grippers 34 and 35, the preform 32 is actually being "pushed" into the downstream milling machine system, 36 and 37. Here a multi-axis CNC machine (computer numerical control) moves on a gantry synchronous with the gripper pull speed, and can machine details into the composite laminate structure/panel on the fly. These can be boltholes, edge routing, milling, or cut-off. The machine 36 is the multi-axis head controlled by the computer 37. After cut-off, the part 33 is removed for assembly or palletizing and shipping.

Figure 2:
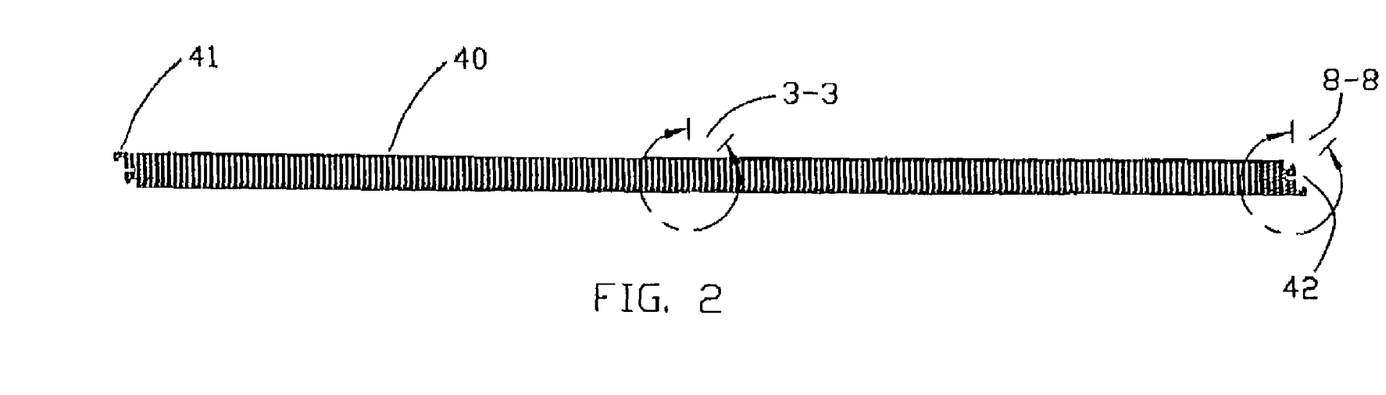
FIG. 2 is schematic vertical cross sectional view of a pultruded composite laminate panel in a preferred embodiment, in which the clinched 3-D Z-axis fibers have been cured on the fly, showing side details. This panel would be used as a new lightweight matting surface for temporary military aircraft runway use.

FIG. 2 illustrates a vertical cross-section of one preferred embodiment. It is a cross-section of a panel 40 that is 1.5 inches thick and 48 inches wide and it will be used as a temporary runway, taxiway, or ramp for military aircraft. In remote locations, airfields must be erected quickly and be lightweight for transporting by air and handling. Panel 40 of FIG. 2 achieves these goals. Because it has been reinforced with the Z-axis groupings of fiber filaments, the panel can withstand the weight of aircraft tires, as well as heavy machinery. Since panel 40 is lightweight, at approximately 3 lbs. per square foot, it achieves a goal for the military, in terms of transportation and handling. Because 40 is pultruded automatically by the process illustrated in FIG. 1, it can be produced at an affordable price for the military. Also shown in FIG. 2 are edge connections, 41 and 42. These are identical but reversed. These allow the runway panels 40 also known as matting, to be connected and locked in place. Clearly, other applications for these composite structures exist beyond this one embodiment.

Figure 3:
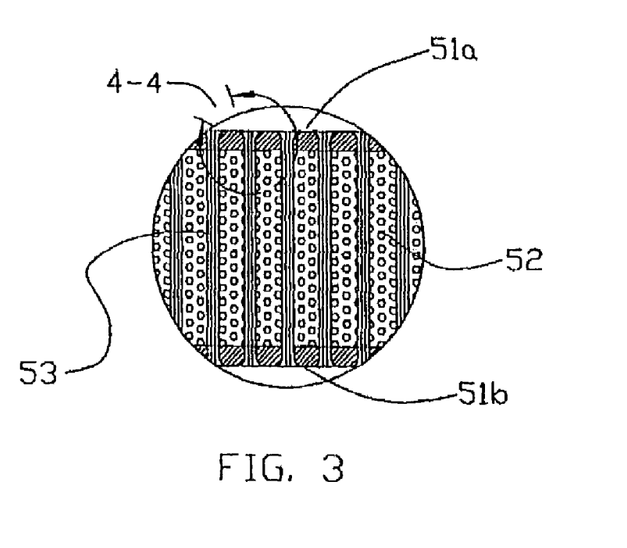
FIG. 3 is a magnified view taken along lines 3—3 of FIG. 2.
Figure 4:
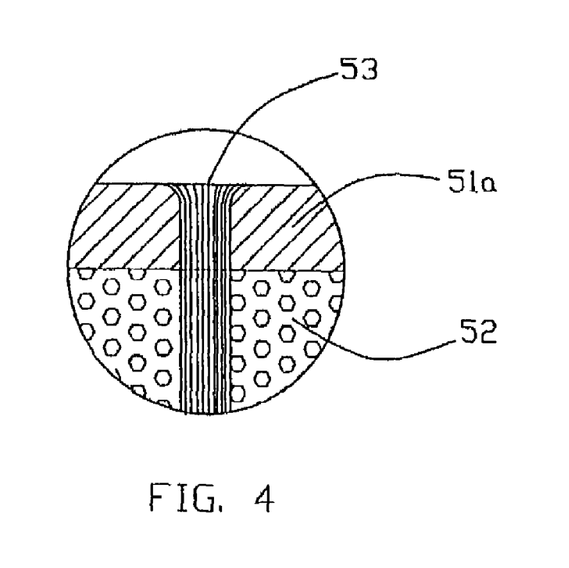
FIG. 4 is a magnified view taken along lines 4—4 of FIG. 3.

FIG. 3 is a magnified view taken along lines 3—3 of FIG. 2. FIG. 3 shows the cross section of the composite laminate structure, including the upper and lower skins 51a and 51b, respectfully. Core 52, which is shown as foam, clearly could be other core material such as end-grain balsa wood. Also shown are the several 3-D Z-axis groupings of fiber filaments 53, which are spaced in this embodiment every 0.25 inches apart and are approximately 0.080 inches in diameter. It can be seen from FIG. 3 that the groupings of fiber filaments 53 are clinched, or riveted to the outside of the skins, 51a and 51b. FIG. 4 is a magnified view taken along lines 4—4 of FIG. 3. FIG. 4 shows core material 52 and the upper skin section 51a and lower skin section 51b. These skin sections are approximately 0.125 inches thick in this embodiment and consists of 6 layers of X-Y stitched glass material at 24 oz. per square yard weight. The Z-axis groupings of fiber filaments 53 can be clearly seen in FIG. 4. The clinching or riveting of these filaments, which lock the skin and core together, can clearly be seen.

Figure 5:
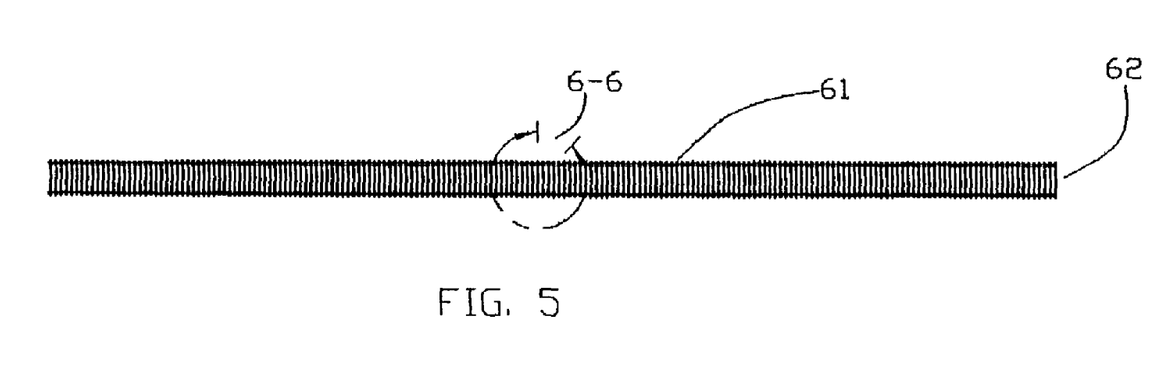
FIG. 5 is a schematic vertical cross-sectional view of the pultruded sandwich panel of the preferred embodiment, just prior to entering the pultrusion die, wherein the 3D Z-axis groupings of fiber filaments have been deposited and they are prepared for clinching and riveting in the die.
Figure 6:
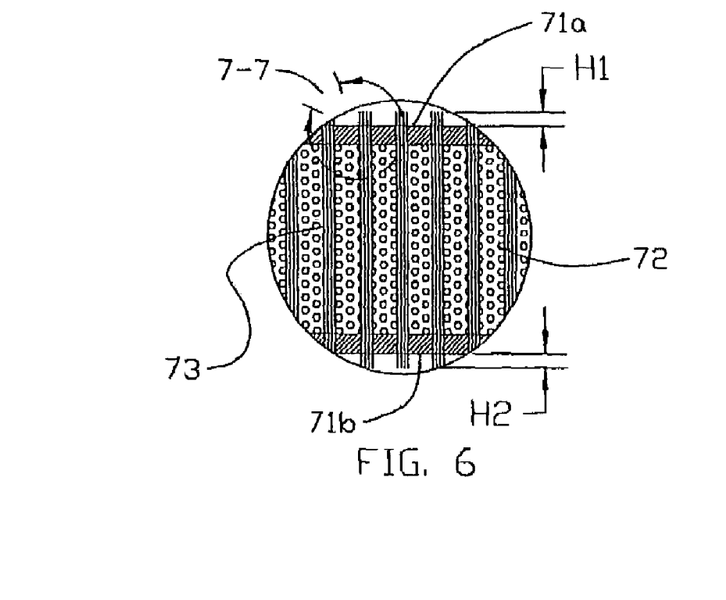
FIG. 6 is a magnified view taken along lines 6—6 of FIG. 5.
Figure 7:
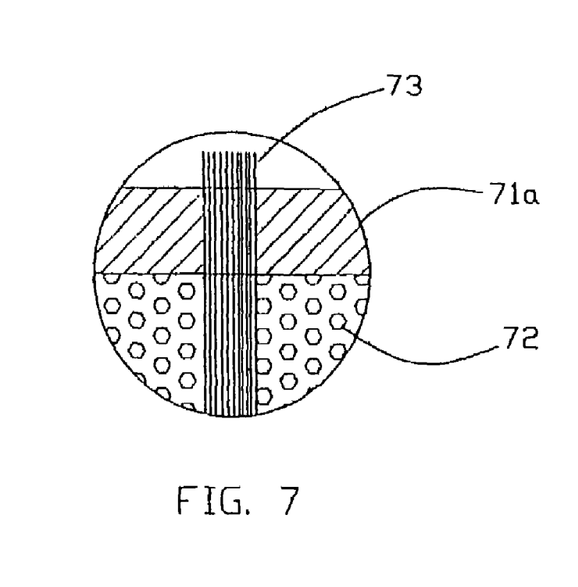
FIG. 7 is a magnified view taken along lines 7—7 of FIG. 6.

FIGS. 2, 3, and 4 show the runway matting material as it would be produced in the method and apparatus of FIG. 1. The schematic section 40 in FIG. 2 is fully cured as it would be leaving pultrusion die 26. Similar drawings of these same sections are shown for the preform of the runway matting material as it would look just prior to entering pultrusion die 26 by FIGS. 5, 6, and 7. FIGS. 5, 6 and 7 correlate with the preform 31 of FIG. 1. FIGS. 2, 3, and 4 correlate with the preform 32 and the part 33 of FIG. 1.

FIG. 5 schematically illustrates the entire matting panel 61 as a preform. The end of the panel 62 does not show the details 42, of FIG. 2 for clarity. The lines 6-6 indicate a magnified section that is shown in FIG. 6.

FIG. 6 shows the skins 71a and 71b, the core 72 and the 3-D groupings of Z-axis fiber filaments 73. One can see the egressing of the fiber filaments above and below skins 71a and 71b by a distance H1 and H2, respectively. The lines 7—7 indicate a further magnification which is illustrated in FIG. 7.

FIG. 7 shows the preform with the core 72 and upper skin material 71a and a single group of Z-axis fiber filaments 73. Note the egressed position of the fiber filaments, which after entering the pultrusion die will be bent over and riveted, or clinched, to the composite skin. Because the skins 71a and 71b are made of X-Y material and the grouping of fiber filaments are in the normal direction to X-Y, or the Z-direction, the composite skin in the region of the 3-D grouping of fiber filaments is said to be a three dimensional composite.

Figure 8:
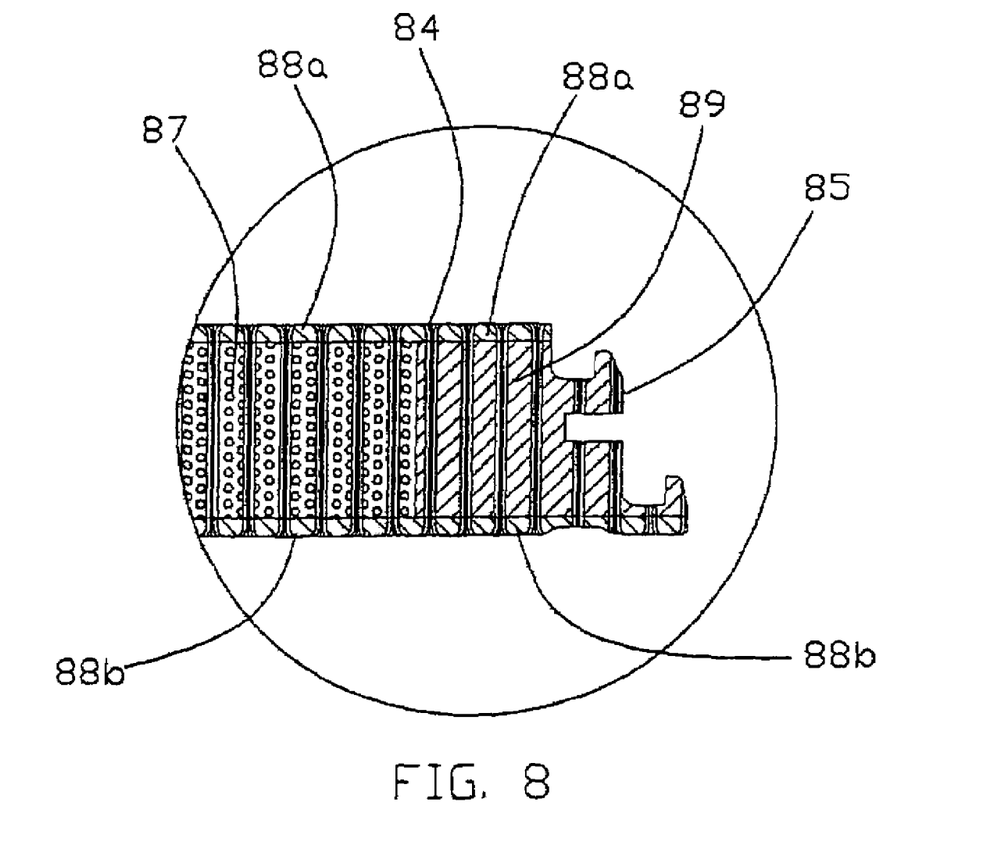
FIG. 8 is a magnified view taken along lines 8—8 of FIG. 2.

FIG. 8 is a magnified view taken along lines 8—8 of FIG. 2 and schematically depicts a core material 87, a skin material 88a and 88b and a new interior composite material 89. As stated this material 89 would consist of X-Y fiber material that is the same as the skin material 88a and 88b but is narrow in width, say 2 to 3 inches wide in this matting embodiment. The 3-D groupings of Z-axis fiber filaments 84 are deposited by the Z-axis deposition machine 24 in FIG. 1, and are operated independent of the density of the material. The 3-D groupings of fiber Z-axis filaments can be easily deposited through either the core material 87 or the higher density X-Y material 89. The interlocking connecting joint 85 can be either machined into the shape of 85 in FIG. 8 or can be pultruded and shaped by the pultrusion die. In FIG. 8 joint 85 is machined. If it were pultruded, the 3-D groupings of Z-axis fiber filaments in 85 would show riveted or clinched ends. Clearly other interlocking joints or overlaps could be used to connect matting panels.

Figure 11:
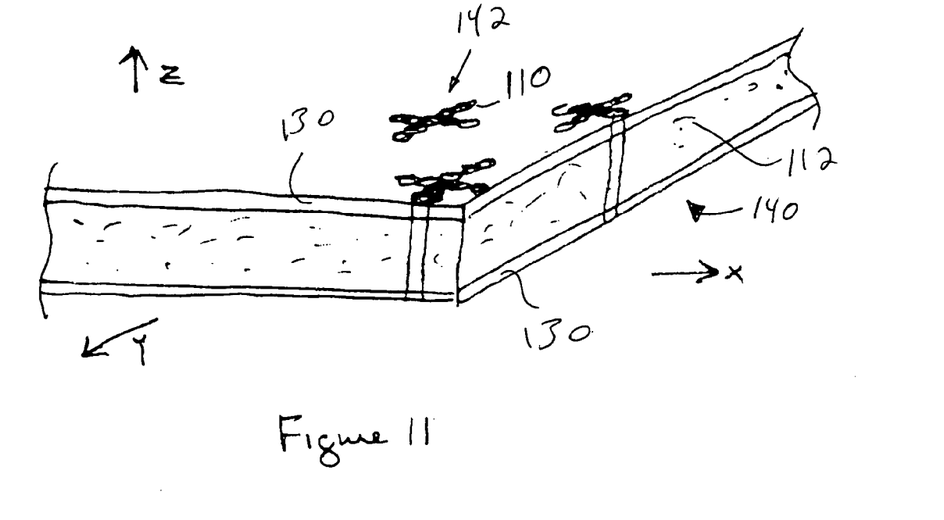
FIG. 11 is a partial perspective view of a Z-axis fiber-reinforced composite laminate structure constructed in accordance with an embodiment of the invention.

With reference to FIG. 11, a 3-D Z-axis fiber-reinforced composite laminate structure 140 with high moment-of-inertia cured resin Z-axis fiber structural elements 142 will be described. The high moment-of-inertia cured resin Z-axis fiber structural elements 142 increase the shear modulus in the core 112 of the sandwich composite compared to Z-axis fiber bundle arrangements used in the past.

Each Z-axis fiber bundle 110, being 0.088 inches in diameter, has a low moment of inertia, I, of $289 \times 10^{-6}$ in.$^4$. Slightly increasing the density of the Z-axis fiber bundles 110, from say 16 to 32, in only the Y direction, will not significantly improve the moment of inertia. However, if the Z-axis fiber bundles 110 are deposited contiguous to other Z-axis fiber bundles 110, as shown in FIG. 11, especially in both the X and Y directions, and wetted with resin, then a dramatic increase in moment of inertia occurs.

The Z-fiber deposition machine 24 (FIG. 1) may deposit the Z-axis fiber bundles 110 in an infinite array of patterns prior to wetting and catalyzation of the laminate. The Z-fiber deposition machine 24 may have multiple insertion mechanisms that are precisely controlled in the X and Y directions to create these Z-axis density patterns, which can range from 0 to 90 fibers per square inch of 113 yield rovings in glass. For example, by inserting 0.125 inch fiber bundles 110 side-by-side, at 0.125 in. spacing, in the X-direction and in the Y-direction (for Y spacing of ¾ in. and X spacing of 1.0 in.) will result in a density of Z-axis fiber bundles 110 of 30 per square inch of laminate.

As shown in FIG. 11, the structural elements 142 include Z-axis fiber bundles 110 inserted contiguous to each other in the X and Y directions in the shape of crosses. Upon resin impregnation/wetting, the Z-axis fiber bundles 110 deposited adjacent to each other fill with resin. The resin fills the voids in the bundles 110 and, once cured, attach the bundles to form the crossed Z-Y/Z-X structural elements 142.

The Z-Y/Z-X structural elements 142 dramatically improve shear resistance in the Z-axis fiber composite laminate structure 140. Note from the following moment of inertia calculations for a cylinder (Equation 2) and a panel (Equation 3) that in particular within Equation 3, the term, h, which is $$I = \frac{\pi d^4}{64} \quad \text{(Equation 2)}$$

$$I = \frac{bh^3}{12} \quad \text{(Equation 3)}$$

the length of the structural panels in the structural elements 142 of FIG. 11 (whether in the x-direction or the y-direction) is a very powerful factor. Therefore; increasing h to values beyond d will greatly improve 1, and this improves the shear resistance.

For example, if the lengths of the structural panels of the structural elements 142 are 0.5 inches, then the moment of inertia is increased to about $1.0 \times 10^{-3}$, which is a 360 times increase in the moment of inertia, where h=0.5 inches and assumes a resin-rich width (on average) of 0.1 inches. (Note: the cross 142 could be increased in length, in width, and staggered in any fashion across the sandwich core. This provides a more efficient deposition pattern of Z-axis fiber bundles 110.)

Figure 12:
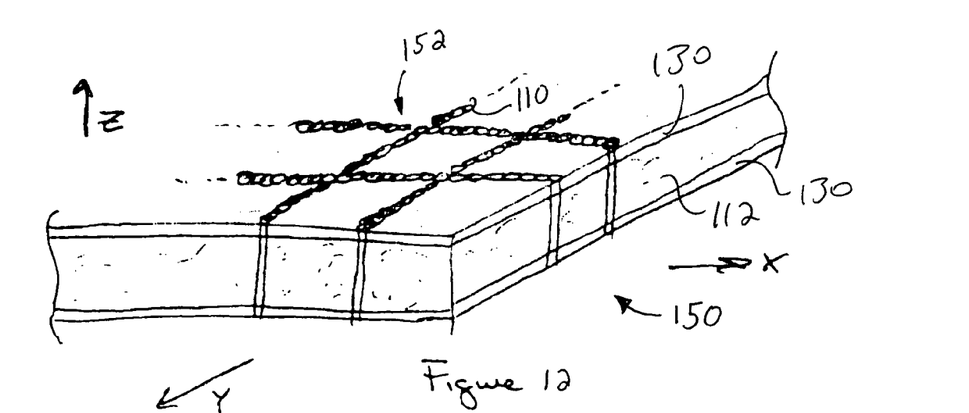
FIG. 12 is a partial perspective view of a Z-axis fiber-reinforced composite laminate structure constructed in accordance with another embodiment of the invention.

FIG. 12 shows an alternative embodiment of a Z-axis fiber-reinforced composite laminate structure 150 with structural elements/panels 152 that are an extension of the cross pattern illustrated in FIG. 11. In FIG. 12, the Z-axis fiber bundles 110 are deposited contiguous to each other, across substantially the entire width and length of the composite laminate structure 150. Once wetted with resin and cured, the Z-axis fiber bundles 110 form a high moment-of-inertia grid of lateral and longitudinal structural elements/panels 152. This results in a very high shear modulus in the core 112. Depending on the thickness and spacing of the structural elements 152 of FIG. 12, the shear modulus of the Z-axis fiber-reinforced composite laminate structure 50 may be greater than 45,000 psi.

Although FIGS. 11 and 12 show the Z-axis fiber bundles 110 deposited contiguously in longitudinal row-like configurations in only the X direction and lateral row-like configurations in only the Y direction, as used herein, "extending in both the X and Y directions" means the contiguous Z-axis fiber bundles 110 are disposed longitudinally in only the X direction and laterally in only the Y direction, or are disposed in a direction that includes both X-directional and Y-direction components (e.g., at an angle across the Z-axis fiber-reinforced composite laminate structure).

There are a number of structural elements with high moment-of-inertia shapes other than those shown herein and described above that can be created with the processes set forth in U.S. Pat. Nos. 6,645,333 and 6,676,785 to form high moment-of-inertia structural elements. These other high moment-of-inertia shapes may include a lower or a higher shear modulus than the shapes shown in FIGS. 3 and 4. For example, but not by way of limitation, the structural elements may be I-beams, hollow cylinders, ellipses, square tubes, and any number of other shapes for controlling the shear resistance in a 3-D Z-axis fiber composite laminate structure. In one or more alternative embodiments, the Z-axis fiber bundles 110 may be double-wide fiber bundles, triple-wide fiber bundles, or more in width. Additionally or alternatively, the Z-axis fiber bundles 110 may have an alternative diameter fiber bundles other than 0.125 in. diameter fiber fundles (e.g., greater, less). With wider fiber bundles and/or greater diameter fiber bundles, fewer insertions would be required to obtain greater fiber bundle mass.

If the sandwich depth becomes too deep, an instability may occur in these structural elements in shear. This can be overcome by reducing the effective Z-directional height of the structural elements by adding one or more layers of X-Y material in the center of the core of the sandwich. These could be fed into the process as X-Y plies of fibrous material between sheets of core material.

The structural elements made of contiguous cured resin Z-axis fiber bundles form Z-Y and Z-X structural panels that significantly improve shear resistance in the Z-axis fiber-reinforced composite laminate structure. The clinching and integration of the Z-axis fiber bundles 110 into the skins 130 of the Z-axis fiber-reinforced composite laminate structure also improves the shear resistance in the Z-axis fiber-reinforced composite laminate structure.

It will be readily apparent to those skilled in the art that still further changes and modifications in the actual concepts described herein can readily be made without departing from the spirit and scope of the invention as defined by the following claims.

What is claimed is:

1. A shear-resistant Z-axis fiber-reinforced composite laminate structure, comprising:
    a core material;
    an upper laminate;
    a lower laminate;
    a plurality of contiguous cured resin Z-axis fiber bundles disposed in the core material between the upper laminate and the lower laminate to form high moment-of-inertia solid composite structural elements in the core material, wherein the taxis fiber bundles include opposite ends terminating at the upper laminate and the lower laminate.

2. The composite laminate structure of claim 1, wherein the high, moment-of-inertia structural elements include solid composite structural panels in the core material in at least one of the Z-X direction and the Z-Y direction.

3. The composite laminate structure of claim 1, wherein the ends of the Z-axis fiber bundles are clinched into and integrated with the upper laminate and the lower laminate.

4. The composite laminate structure of claim 1, wherein the high moment-of-inertia structural elements include multiple separate high moment-of-inertia structural elements in the core material extending in both Z-X and Z-Y directions.

5. The composite laminate structure of claim 1, wherein the high moment-of inertia structural elements include a connected grid of high moment-of-inertia, structural elements in the core material extending in both Z-X and Z-Y directions.

6. The composite laminate structure of claim 1, wherein the composite laminate structure includes more than one layer of core material with the high moment-of-inertia structural elements disposed therein.

7. A method of creating a shear-resistant Z-axis fiber-reinforced composite laminate structure, comprising:
   providing a core material;
   providing an upper laminate;
   providing a lower laminate;
   inserting a plurality of contiguous Z-axis fiber bundles in the core material between the upper laminate and the lower laminate;
   wetting the plurality of contiguous Z-axis fiber bundles with a resin;
   curing the resin to form high moment-of-inertia solid composite structural elements in the core material made of the plurality of contiguous cured resin Z-axis fiber bundles disposed in the core material between the upper laminate and the lower laminate, wherein the Z-axis fiber bundles include opposite ends terminating at the upper laminate and the lower laminate.

8. The method of claim 7, wherein the high moment-of-inertia structural elements include solid composite structural panels in the core material in at least one of a Z-X direction and a Z-Y direction.

9. The method of claim 7, wherein depositing includes depositing the plurality of Z-axis fiber bundles contiguously in the core material between the upper laminate and the lower laminate to form multiple separate high moment-of inertia structural elements in the core material extending in both Z-X and Z-Y directions.

10. The method of claim 7, wherein depositing includes depositing the plurality of Z-axis fiber bundles contiguously in the core material between the upper laminate and the lower laminate to form a connected grid of high moment-of-inertia structural elements in the core material extending in both Z-X and Z-Y directions.

11. The method of claim 7, wherein the composite laminate structure includes more than one layer of core material with the high moment-of-inertia structural elements disposed therein.

* * * * *